Figure 2:
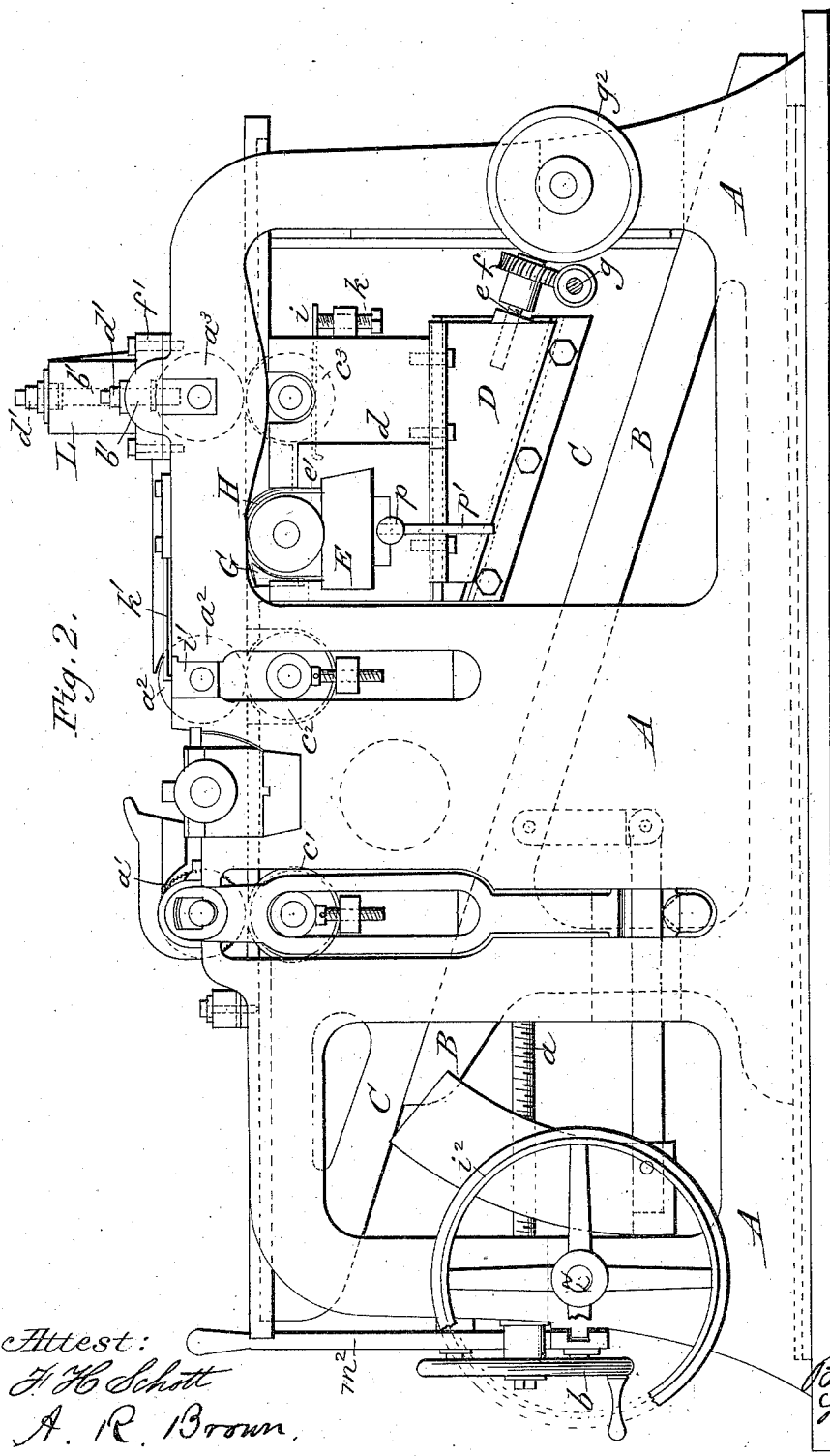

(No Model.)

5 Sheets—Sheet 1.

B. D. WHITNEY.
PLANING MACHINE.

No. 305,647. Patented Sept. 23, 1884.

Attest:
F. H. Schott
A. R. Brown

Inventor:
Baxter D. Whitney
per H. O. Tasker
atty (No Model.)

B. D. WHITNEY.
PLANING MACHINE.

No. 305,647. Patented Sept. 23, 1884.

Attest:
F. H. Schott
A. R. Brown

Inventor:
Baxter D. Whitney
F. J. C. Tasker
att'y (No Model.)
B. D. WHITNEY.
PLANING MACHINE.
No. 305,647. Patented Sept. 23, 1884.
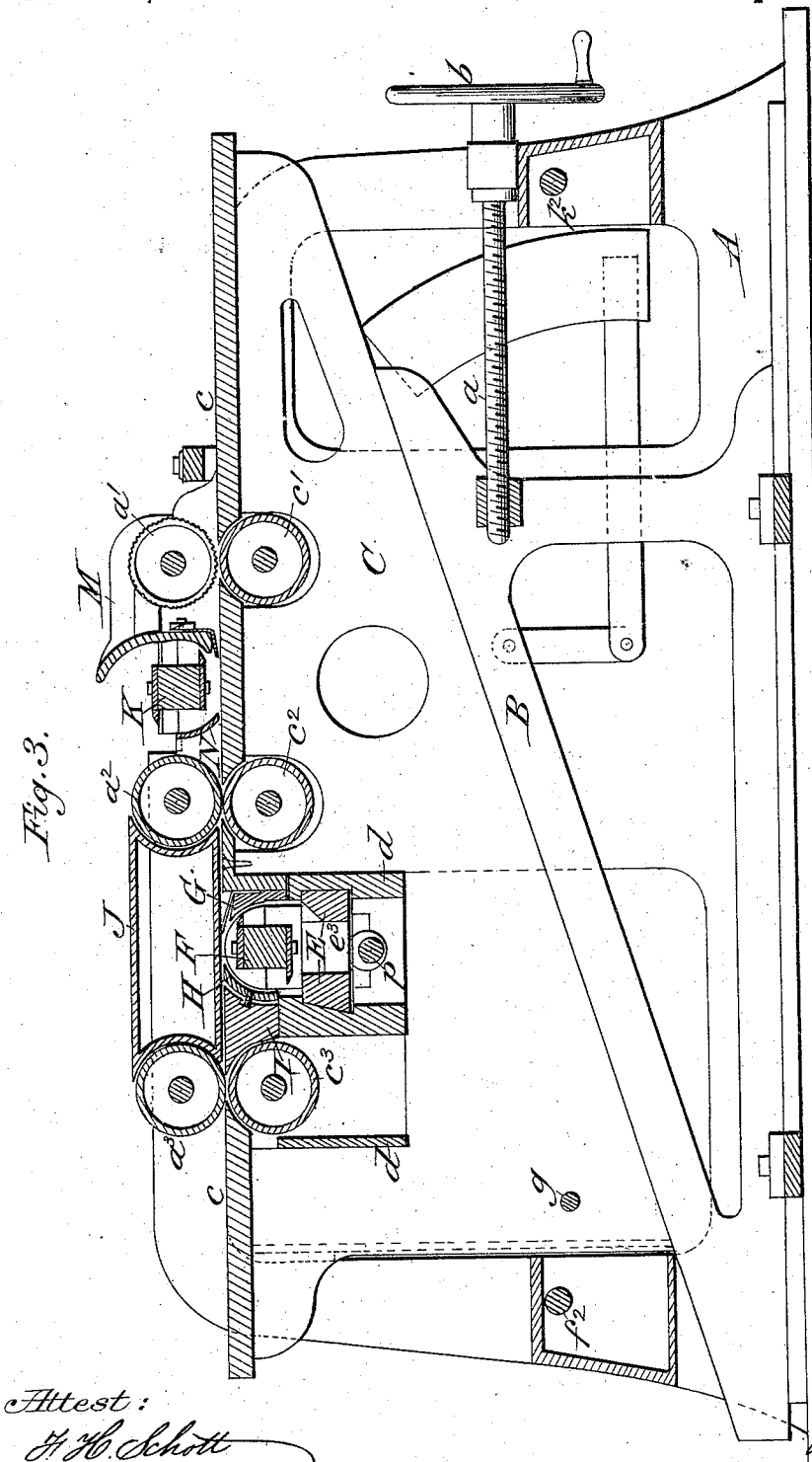

(No Model.)
5 Sheets—Sheet 4.
B. D. WHITNEY.
PLANING MACHINE.
No. 305,647. Patented Sept. 23, 1884.
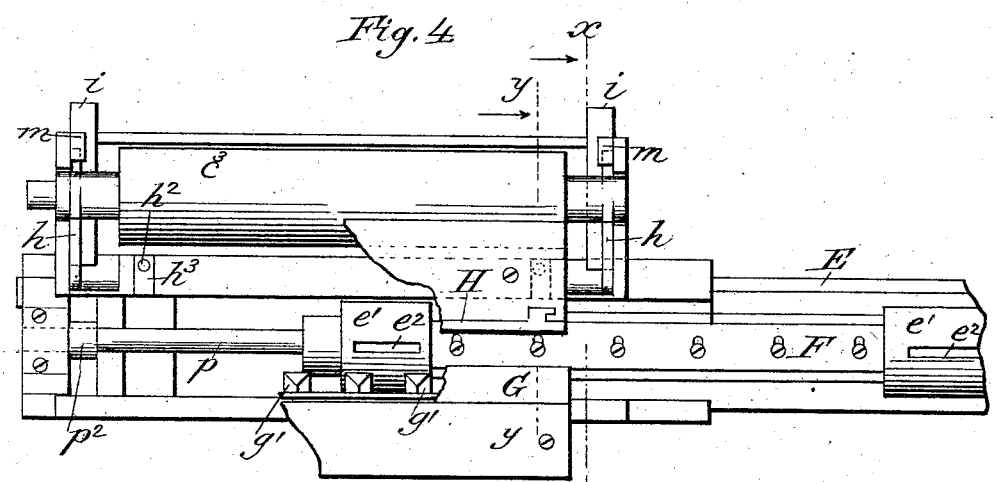
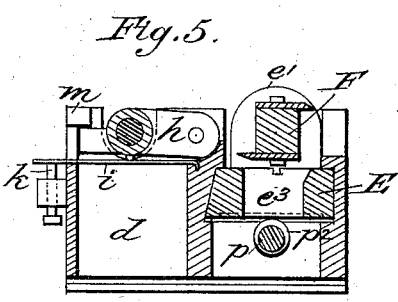
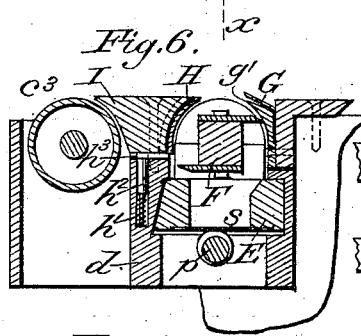
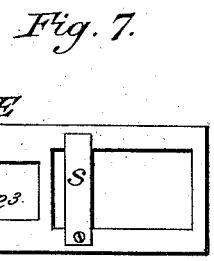
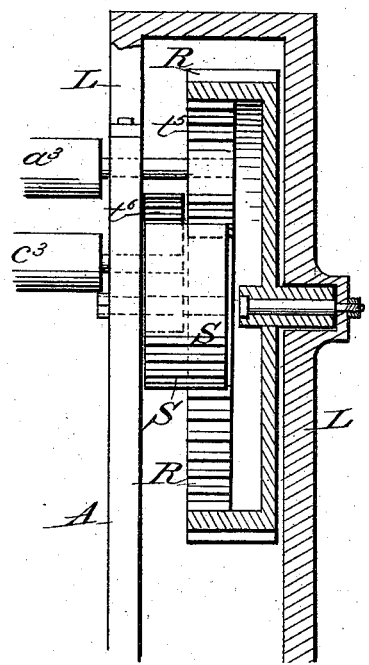
Attest:
H. H. Schott
A. R. Brown
Inventor:
Baxter D. Whitney
per H. O. Fowler
atty
N. PETERS, Photo-Lithographer, Washington, D. C.

(No Model.)
B. D. WHITNEY.
PLANING MACHINE.
No. 305,647. Patented Sept. 23, 1884.
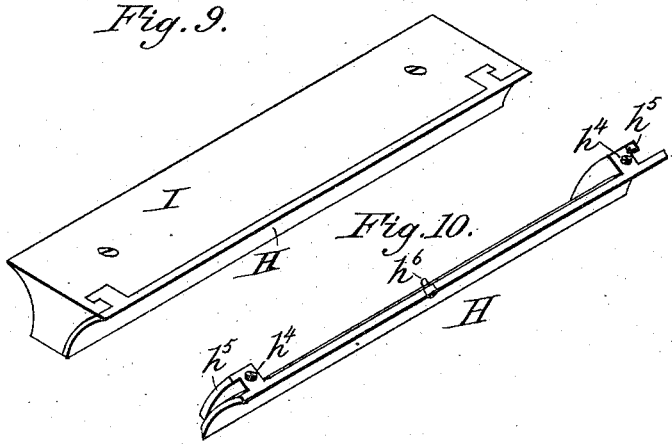
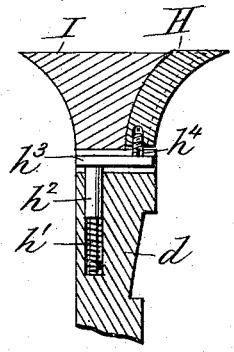
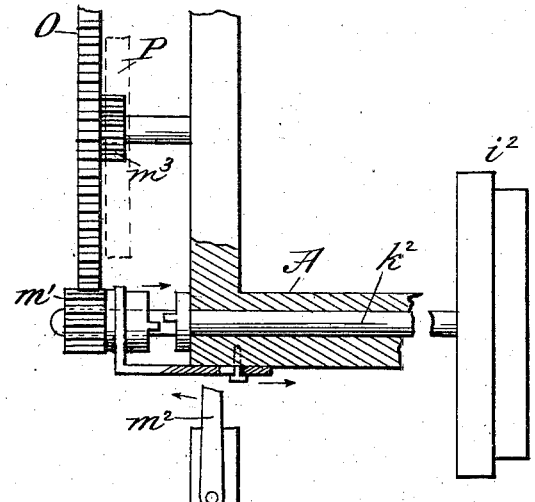
Attest:
F. H. Schott
A. R. Brown.
Inventor:
Baxter D. Whitney

UNITED STATES PATENT OFFICE.

BAXTER D. WHITNEY, OF WINCHENDON, MASSACHUSETTS.

PLANING-MACHINE.

SPECIFICATION forming part of Letters Patent No. 305,647, dated September 23, 1884.

Application filed June 10, 1882. (No model.)

*To all whom it may concern:*

Be it known that I, BAXTER D. WHITNEY, a citizen of the United States, residing at Winchendon, in the county of Worcester and State of Massachusetts, have invented certain new and useful Improvements in Planing-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to that class of planing-machines known as "double surfacers," or those designed for planing both sides of a board simultaneously.

The invention consists of an improved plan of constructing, mounting, and arranging the cutter-cylinder, pressure-bar, and other appliances for dressing the under surface of the lumber, whereby they are made capable of being collectively and simultaneously adjusted or changed in their relation to the other parts of the machine; and, also, in certain details of construction, as hereinafter set forth, so that the parts will combine strength, solidity, and compactness with accessibility and convenience of arrangement for operating and keeping in order to a greater degree than is common with machines of ordinary construction, the object being to make a planing-machine capable of dressing the opposite sides of a board or plank at one passage through the machine, and to provide facilities whereby the mechanism for dressing the under surface of the board may be as readily kept in order and adjustment, and thereby be rendered as efficient, as the appliances commonly used for planing the upper side.

In the annexed drawings, illustrating my invention, Figure 1 is a side elevation of a two-cylinder planing-machine with six feeding-cylinders, and shows the arrangement of the gears for driving the rolls. Fig. 2 is a similar elevation of the opposite side of the machine, showing the main frame and general arrangement of the principal working parts. Fig. 3 is a vertical longitudinal section. Fig. 4 is a top view of an adjustable cross-frame upon which is mounted the lower cutter-cylinder and its adjuncts for dressing the under surface of the board, the cylinder and its bed-piece being represented as partially withdrawn, and portions of the cross-frame and pressure-bars broken away to show the construction of other parts beneath. Fig. 5 is a cross-section on the line $x\ x$ of Fig. 4. Fig. 6 is a similar section on the line $y\ y$, Fig. 4. Fig. 7 shows the under side of one end of the bed-piece of the lower cylinder. Fig. 8 is a detail, partly in section on the line $z\ z$ of Fig. 1. Fig. 9 is a perspective view of the lower rear pressure-bar and its supporting-plate. Fig. 10 is a perspective view of the lower rear pressure-bar detached and inverted, showing its adjusting-screws and the curved projecting ways by which it is connected to its supporting-plate. Fig. 11 is an enlarged sectional detail. Fig. 12 represents the clutch mechanism and connected parts.

Like letters of reference are used to designate the same parts in the several views.

This machine is provided with an upper cutter-head or planing-cylinder and its pressure-bars and other accompaniments for dressing the upper surface of the lumber, said parts being of similar construction and operation to those described in my Letters Patent No. 259,958, dated June 20, 1882. It also has an adjustable cross-frame of novel construction, which carries the lower rear feed-roll and mechanism for planing or dressing the lower surface of the lumber.

The main frame A of the machine supports a lower inclined plane, B, which is operated in the usual manner by means of the screw $a$ and hand-wheel $b$, for the purpose of raising or lowering the upper inclined plane, C, which rests on the lower incline, and in turn supports the bed $c$ of the machine, with its attendant mechanism for supporting, guiding, and regulating the thickness of the lumber being dressed. In the upper incline, C, are journaled the front and central lower feed-rollers, $c'\ c^2$, the back bottom feed-roller, $c^3$, being journaled in a cross-frame, $d$, which is firmly supported in rectangular openings formed in each side of the upper incline. This cross-frame $d$, which also carries the back lower pressure-bar and the removable bed-piece, on which the lower cutter-cylinder is mounted, rests at each side of the machine on inclined planes D D, that are mounted in inclined ways formed on the outer sides of the main upper incline. The inclines D D are provided with screws $e$ $e$, each having a gear, $f$, operated by worms on a horizontal shaft, $g$, which, being revolved, moves the inclines D D up or down to adjust the lower cutters to make any depth of cut from the under surface that may be desired, the adjustment being determinable with great precision by noting the revolutions of the shaft $g$, which may be arranged to represent a certain small measure of vertical movement of cross-frame $d$ at each revolution, thus affording means for graduating the changes of adjustment readily, definitely, and minutely to suit the nature of the work being performed. The cross-frame $d$ is preferably made in two parts or chambers divided longitudinally by a central partition, as shown in Figs. 3, 5, and 6. In one of these parts, or in the rear side of the frame $d$ at the ends, are pivoted the arms $h$ $h$, which are provided with tubular bearings for the journals of the back bottom feed-roll, $c^3$.

Beneath the arms $h$ $h$ are arranged flat springs $i$ $i$, that may be adjusted by means of screws $k$ $k$, so as to bear against slight projections formed on the lower surface of the bearings, in which the journals of the back bottom feed-roll are supported. This roll is thus adapted to act with a yielding pressure upon the material passed between it and the corresponding upper roll, and so gives a continuous pressure to the lumber being planed, thereby carrying it out of the machine. The upward movement of the roll $c^3$ is limited by the stops $m$ $m$, against which the ends of the arms $h$ $h$ will bear when the roll is at its extreme height.

In the front portion of the cross-frame $d$ is journaled an eccentric-shaft, $p$, at one end of which is a lever, $p'$. This shaft is provided with cams or eccentrics $p^2$ $p^2$, that are so arranged as to be capable of bearing against spring-plates $s$ $s$, that are placed across the lower recessed surface of a removable bed-piece, E, which is thus detachably secured within the frame in a simple and convenient manner, being made to bear upward against flanges formed in the frame. These spring-plates, while serving to equalize the bearing of the cams or eccentrics which come in contact with them, are not deemed strictly essential with reference to the correct action of other parts, and, if preferred, they may therefore be dispensed with. Any equivalent locking devices may also be substituted for the eccentrics or eccentric-shaft with equally good results.

The construction of the removable bed E is shown in Figs. 2, 3, 4, 5, and 7. At each end it is provided with bearings $e'$ $e'$ for the journals of the lower cutter head or cylinder, F, said bearings being made in separable parts that are connected in any suitable manner, so that the cutter-head may be readily removed and replaced, if desired. These bearings are provided with suitable openings, $e^2$, through which lubricants may be introduced when required. The bed E is slotted longitudinally between the bearings $e'$ $e'$, as shown at $e^3$ in Figs. 3, 5, and 7, for the purpose of facilitating the passage of chips and shavings. This bed is removably secured within the frame $d$, in the manner already described, or by the employment of any suitable locking devices, in such a manner as to secure great strength and solidity with compactness of form. When unlocked, the bed E and its attached cutter-cylinder may be readily withdrawn from the machine, as represented in Fig. 4, for the purpose of sharpening and setting the cutters without disarrangement or change of adjustment of any other part of the mechanism, which is an important feature of convenience and economy in operating the machine.

On the approach side of the lower planing-cylinder, F, is a yielding pressure-bar, G, made with a flexible plate or pad, and auxiliary supports $g'$, similar to the flexible foot-plate of my improved pressure-bar used with the upper planing-cylinder, the particular description of which is included in my former patent; but the lumber having been reduced to the required thickness by the action of the upper cylinder, so that only a surface cut is made by the lower cutters, the range of action required of the pressure-bar G is so limited that it does not need to have the curvilinear movement of a bar used for reducing the lumber to uniform thickness, and I therefore fix this bar G directly to the adjustable cross-frame $d$, so that its normal position may be adjusted relatively to its surface to determine the degree of tension with which it shall act upon the lumber passing over it.

On the discharge side of the cylinder F is another pressure-bar, H, which is rigid in its structure and similar in its action to that used upon the exit side of a cylinder for dressing the upper surface of boards, except that it is applied to press in an upward instead of a downward direction, which is effected by springs $h'$, acting upon posts $h^2$, having projecting plates $h^3$, which also act as stops to arrest the action of the springs at the proper position, so that the lift of the bar H, when adjusted by screws $h^4$, bearing upon the projections $h^3$, may be regulated as required. The bar H is curved to correspond with the circle of the cutter-cylinder F, and is supported by means of projecting curved ways $h^5$ on its rear, which engage in grooves in a plate, I, that rests on the cross-frame $d$, and fills the space between the bar H and rear roller, $c^3$, a stop-screw or retaining-pin, $h^6$, being inserted in the under or rear side of the bar H and entering a notch or groove in the piece I to keep the bar H from being accidentally misplaced.

The construction of the bar H and its arrangement with relation to the adjacent parts is shown in Figs. 3, 6, 9, 10, and 11.

The cross-frame $d$, which carries the lower cutter-cylinder, F, with its rear pressure-bar, H, plate I, and lower rear feed-roll, $c^3$, extends transversely from side to side of the main bed-frame or upper incline, C, and is so fitted therein that it may be elevated or depressed to change the line of cut relatively to the plane of the table or main bed, for which purpose there is provided the secondary set of inclined planes D D and their operating mechanism, as before described, the whole being so arranged as to be capable of raising or lowering the cross-frame $d$ with its cutter-cylinder and other appurtenances the one-hundredth of an inch, thus affording a very good micrometric standard for graduating the thickness of the shaving to be removed. Directly over this "under-surface" planing mechanism is arranged the top bearing-plate or inverted table, J, which is rigidly attached to the sides of the main frame A, with the plane of its face or under side very nearly coincident with the line of cut of the first or upper cutter-cylinder, K, so that it may provide a broad and firm support or bearing for holding the lumber to the action of the lower cutters as it is passed over them.

The feeding-rollers, six in number, are arranged in pairs to act on opposite sides of the board to carry it forward and aid in holding it in position for the action of the cutters. The first pair, being situated just forward of the first or upper cutter-cylinder, K, feeds the piece forward until it reaches the second pair, situated midway between the two cutter-cylinders, when they act to pass it along to the third and last pair, which draw it past the second or lower cutter-cylinder, F, and discharge it at the rear end of the machine. The upper feed-rolls, $a'$ $a^2$ $a^3$, are all journaled in boxes attached to the frame A. The first roller, $a'$, acting upon the unplaned boards of unequal thickness, has hangings weighted in like manner as those described in my patent before mentioned, which admits of an ample range of vertical movement. This roller $a'$ is corrugated in the usual manner. The second, $a^2$, acting upon the planed portion of the board, needs to yield but little, and the boxes $i'$ of this roller are held down by springs $k'$. The third, $a^3$, is fixed or adjusted in its vertical position to coincide with the face of the plate J in its bearing upon the board, while the lower roller of the third pair is mounted in depressible hangings or arms $h\ h$, sustained by springs $i\ i$, as before described; and those of the first and second pair are held in the main bed-piece or upper incline, C, being adjusted in their positions in any suitable manner to coincide with the surface of the table and insure a proper action of all the parts, as will be readily understood by those skilled in the art.

The upper rear feed-roll, $a^3$, which is journaled in suitable boxes attached to the main frame, as before described, may be adjusted to any desired height by means of the screws $b'$ and check-nuts $d'$, as shown in Figs. 1 and 2, the screw at one end of the roll being long enough to pass up through the overhanging end of a standard, L, which is placed at one side of the machine, while at the other end of the roll the screw need be of a length sufficient only to pass through the cap $f'$. When thus adjusted to the desired position, the roll $a^3$ remains stationary, though free to revolve with the other feed-rolls, as hereinafter described.

The construction, arrangement, and operation of the upper cutter-cylinder, K, and pressure-bars M N, as before observed, are substantially the same as described in my former patent, above mentioned, and therefore need not be explained. Rotary motion is imparted to the feed-rollers by a system of gearing represented in Figs. 1 and 8. The gears upon each of the feed-rolls are made to considerably exceed the diameter of their respective rolls, and are so placed as to lap by each other when the rolls are closed together. This affords greater transmissive power with less lateral strain on the roll-bearings than with smaller gears. It also facilitates connection with the train of intermediate gearing by which they are driven. The feeding-power is preferably taken from a pulley, $b^2$, Fig. 1, on the upper cutter-cylinder, K, by belting to a band-wheel, $d^2$, on the rear counter-shaft, $f^2$, Fig. 3, and then transmitted by belting from a pulley, $g^2$, Fig. 2, on the opposite end of said shaft to a pulley, $l^2$, Fig. 2, on the shaft $k^2$, Fig. 3, at the front end of the machine. This shaft carries a pinion, $m'$, which meshes with a gear, O, Fig. 1, and is provided with a suitable clutch mechanism, Fig. 12, that is adapted to be operated by a shipper-lever, $m^2$, for the purpose of starting and stopping the feed. The gear O is provided with a pinion, $m^3$, that meshes with the large double-faced gear P, which drives the large intermediate gear, Q, and also the small gear $t'$ on the shaft of the front lower feed-roll. The large intermediate gear, Q, meshes with and drives the small gears $t^2$ and $t^3$ on the shafts of the front upper feed-roll, $a'$, and central upper feed-roll, $a^2$, respectively. The large intermediate gear, Q, also drives the large double-faced gear R at the rear end of the machine. This latter gear, the face of which is of a breadth equal to the face of the gear P and twice as great as that of the intermediate gear, Q, is formed with both internal and external cogs. By means of its external cogs it meshes with the large gear Q, and also with the small gear $t^4$ on the shaft of the lower central feed-roller. The internal cogs of the large double-faced gear R mesh with a small gear, $t^5$, on the shaft of the rear upper feed-roller, and also with a small intermediate gear, S, which is also broad-faced to carry it in line with the small gear $t^6$ on the shaft of the lower rear feed-roller, with which gear it meshes, the internal cogs of the large gear R being formed only on that side of the large gear nearest the frame of the machine, as shown in Fig. 8.

In order to provide a support for the large double-faced gear R without interference with the gear $t^6$ in adjusting the lower rear feed-roll, $c^3$, which gear $t^6$ then passes across the gear R at or near its center, I journal said gear R to the inner side of the standard L, as shown in Fig. 8. This standard projects from the base of the machine, and has an overhanging portion, as before described, which acts as a cap to one of the journals of the upper rear feed-roller. The standard also affords an additional bearing for the rear counter-shaft and its attached pulleys.

As the gears $t'$, $t^4$, and $t^6$ are subject to vertical adjustment with their respective rolls for the purpose of dressing boards or planks of varied thickness, the horizontal plane of the centers of the gears P, R, and S are placed to coincide with those of the lower rolls when about midway of their range, so that the depth of mesh need not be materially affected by changes of position, and large diameters are used to make the variations less than otherwise. These gears P, R, and S are also broad-faced, for the purpose of matching the offsetting gears of the lower rolls.

As the functions of the various parts of a planing-machine are generally understood by practical workmen, and can be readily traced by the description already given, it is deemed unnecessary to give a detailed statement of the action of the mechanism in planing, and I will only briefly allude to some of the advantages of my special construction or arrangement. First, by mounting the lower cylinder, F, and its accompaniments which act upon the board in the plane of its cut, and which should be kept in the same relative adjustment (to wit, the rear pressure-bar H, plate I, and lower rear roll, $c^3$) upon a special carrying device like the cross-frame $d$, with provisions, as described, for changing the position of the same relatively to the plane of the surface of the main table or upper incline, C, it affords a ready, exact, and reliable means of adjusting this part of the mechanism with great nicety for the removal of whatever portion of material may be necessary (according to the roughness and inequality of the lumber) to obtain a smooth surface or give it a proper dressing, which is an important consideration for the economical operation of a planing-machine, and has heretofore been an imperfectly-developed element in the mechanism used for dressing the under side of the lumber in double surfacers as generally built. Second, the manner of applying the lower cutter-cylinder, F, whereby it is made readily detachable and removable and fully accessible for purposes of sharpening and setting the cutters without disturbance of other parts, is not only a great convenience, but it admits of much greater permanence in the construction and maintenance of the working parts (viz., the top bearing-plate or table-rolls, &c.) than is possible where those parts must be detached to get at the cutters. While the construction of the bed-piece E of a form to correspond with and fit to its receiving-chamber in the cross-frame $d$ unites the parts in a manner to mutually support and strengthen each other, which is an essential condition in the efficiency of their action. Third, the combination and arrangement of the improved form of pressure-bars with the other parts enables me to perform much better work than can be done without them, and with the general arrangement of mechanism and the system of gearing as applied for operating the feeding-rollers results in making a very compact and efficient machine.

Having thus described my invention, what I claim as new, and desire to secure by Letters Patent, is—

1. In a double-surface planing-machine, the combination, with the main table or bed which supports the lumber for the action of the upper cutters, of a cross-frame, $d$, adjustable independently of the rest of the bed, and carrying the lower cutter and pressure devices, substantially as described.

2. In a planing-machine, the combination, with the main table or bed, the upper cutter and pressure devices, and the independently-adjustable cross-frame $d$, carrying the lower pressure devices, of the removable bed-piece E, supported in said cross-frame, and carrying the lower cutter, F, substantially as described.

3. In a planing-machine, the combination, with the main table or bed, the upper cutter and pressure devices, and the cross-frame $d$, adjustable independently of the rest of the bed and carrying the lower cutter-cylinder and rear bottom feed-roll, $c^3$, of the flexible pressure-plate G and the pressure-bar H, both supported by the cross-frame and adjustable therewith, substantially as described.

4. In a planing-machine, the combination, with the main table or bed, the upper cutter, the upper pressure devices, and the independently-adjustable cross-frame $d$, carrying the lower cutter, F, and flexible pressure-plate G, of a rigid pressure-bar, H, having a curvilinear movement nearly concentric to or corresponding with the path described by the cutting-edges of the knives of the lower cutter-head, said pressure-bar being supported by the adjustable cross-frame, and having springs to impart a yielding upward pressure against the under side of the board being planed, substantially as described.

5. In a planing-machine, the combination, with the main table or bed and the cross-frame $d$, carrying the removable bed-piece E and the lower cutter and pressure devices, of the inclined planes D D, screws $e\ e$, shaft $g$, and connecting-gearing, whereby the lower cutter and its accompaniments are simultaneously adjusted with relation to the main bed, upper cutter, and upper pressure devices, substantially as described.

6. In a planing-machine, the combination, with the main table or bed, the upper cutter, and the upper pressure devices, of the independently-adjustable cross-frame $d$, carrying the feed-roll $c^3$ and pressure-bars G H, the removable bed E, supported in said frame and carrying the lower cutter-head, F, and means for locking said bed within the cross-frame, substantially as described.

7. In a planing-machine, the combination, with the upper incline, C, and cross-frame $d$, adapted to support the lower cutter-head and accompanying mechanism, of the secondary inclines D D, shaft $g$, and connections, whereby the cross-frame is capable of an independent adjustment, substantially as described.

8. In a planing-machine, the combination, with the upper feed-rolls and inverted table J, of the lower pressure-bars, G H, and the cutter-head F and rear bottom feed-roll, $c^3$, said cutter-head and rear bottom feed-roll being mounted in a cross-frame having an independent adjustment relative to that of the main table, substantially as described.

In testimony whereof I affix my signature in presence of two witnesses.

BAXTER D. WHITNEY.

Witnesses:
A. R. BROWN,
PHILIP MAURO.